(12) United States Patent
Nakamura

(10) Patent No.: US 11,572,735 B2
(45) Date of Patent: Feb. 7, 2023

(54) MULTISTAGE PRISM WINDOW

(71) Applicant: YAZAKI ENERGY SYSTEM CORPORATION, Tokyo (JP)

(72) Inventor: Takuju Nakamura, Tokyo (JP)

(73) Assignee: YAZAKI ENERGY SYSTEM CORPORATION, Tokyo (JP)

( * ) Notice: Subject to any disclaimer, the term of this patent is extended or adjusted under 35 U.S.C. 154(b) by 391 days.

(21) Appl. No.: 17/033,642

(22) Filed: Sep. 25, 2020

(65) Prior Publication Data

US 2021/0010318 A1 Jan. 14, 2021

Related U.S. Application Data

(63) Continuation of application No. PCT/JP2019/007153, filed on Feb. 25, 2019.

(30) Foreign Application Priority Data

Mar. 27, 2018 (JP) .............................. JP2018-059197

(51) Int. Cl.
*E06B 3/67* (2006.01)
*G02B 5/04* (2006.01)
*G02B 5/12* (2006.01)

(52) U.S. Cl.
CPC .................. *E06B 3/67* (2013.01); *G02B 5/04* (2013.01); *G02B 5/12* (2013.01)

(58) Field of Classification Search
CPC .............. E06B 3/66; E06B 3/663; E06B 3/67; E06B 9/24; E06B 2009/2417; E06B 2009/2464; F21S 11/007; F21V 5/02; G02B 5/04; G02B 5/045; G02B 5/12; G02B 5/124
USPC ........ 359/592, 597, 601, 613, 614, 833, 837
See application file for complete search history.

(56) References Cited

U.S. PATENT DOCUMENTS

| 3,393,034 A | * | 7/1968 | Imai ......................... F21S 11/00 |
| | | | 359/593 |
| 5,461,496 A | | 10/1995 | Kanada et al. |
| 5,650,875 A | | 7/1997 | Kanada et al. |
| 5,880,886 A | * | 3/1999 | Milner ................... G02B 5/045 |
| | | | 359/593 |
| 6,311,437 B1 | | 11/2001 | Lorenz |

(Continued)

FOREIGN PATENT DOCUMENTS

| CN | 102742031 A | 10/2012 |
| DE | 693 28 156 T2 | 12/2000 |

(Continued)

*Primary Examiner* — Ricky D Shafer
(74) *Attorney, Agent, or Firm* — Kenealy Vaidya LLP

(57) ABSTRACT

A multistage prism window includes first and second transparent plate materials, a first prism, a reflection member, a second prism, and a heat absorption member. The first prism collects, onto the reflection member, light whose angle with respect to a normal line of the first and second transparent plate materials is equal to or greater than a first predetermined angle and transmits light whose angle with respect thereto is smaller than the first predetermined angle. The second prism collects, onto the heat absorption member, light whose angle with respect to the normal line is smaller than the first predetermined angle and equal to or greater than a second predetermined angle and transmits light whose angle with respect thereto is smaller than the second predetermined angle.

14 Claims, 10 Drawing Sheets

(56) References Cited

U.S. PATENT DOCUMENTS

| | | | | |
|---|---|---|---|---|
| 8,057,715 | B2* | 11/2011 | Foley | B32B 37/20 |
| | | | | 264/220 |
| 11,300,263 | B2* | 4/2022 | Nakamura | F21S 11/007 |
| 11,313,172 | B2* | 4/2022 | Nakamura | E06B 3/90 |
| 11,319,749 | B2* | 5/2022 | Nakamura | G02B 26/004 |
| 2008/0030859 | A1* | 2/2008 | Usami | E06B 3/6715 |
| | | | | 264/1.9 |
| 2009/0255568 | A1* | 10/2009 | Morgan | H01L 31/0547 |
| | | | | 136/246 |
| 2012/0222722 | A1 | 9/2012 | Baruchi et al. | |
| 2017/0052295 | A1 | 2/2017 | Sakuma et al. | |
| 2017/0284619 | A1 | 10/2017 | Kashiwagi et al. | |
| 2020/0324245 | A1* | 10/2020 | Nakamura | E06B 5/00 |
| 2020/0328717 | A1* | 10/2020 | Nakamura | G02B 5/04 |
| 2021/0047883 | A1* | 2/2021 | Nakamura | G02B 5/124 |
| 2021/0062575 | A1* | 3/2021 | Nakamura | E06B 3/66 |

FOREIGN PATENT DOCUMENTS

| | | |
|---|---|---|
| EP | 1 072 752 B1 | 1/2001 |
| JP | 2015-174810 A | 10/2015 |
| JP | 2015-210319 A | 11/2015 |
| JP | 2017-151249 A | 8/2017 |
| JP | 2017-161692 A | 9/2017 |
| JP | 2017-211442 A | 11/2017 |
| JP | 2017-214822 A | 12/2017 |

\* cited by examiner

MULTISTAGE PRISM WINDOW

CROSS-REFERENCE TO RELATED APPLICATIONS

This is a continuation of International Application No. PCT/JP2019/007153 filed on Feb. 25, 2019, and claims priority from Japanese Patent Application No. 2018-059197, filed on Mar. 27, 2018, the entire content of which is incorporated herein by reference.

TECHNICAL FIELD

Exemplary embodiments of the present invention relate to a multistage prism window.

BACKGROUND ART

In a related art, proposed is a retro-reflective window in which direct light from the sun is retro-reflected to a sun side by providing a prism between a plurality of transparent plate materials or integrally with the transparent plate material (for example, refer to JP-A-2015-210319, JP-A-2015-174810, and JP-A-2017-211442). Also, proposed is an indoor use window in which the prism is used to reflect the direct light and an indoor ceiling side is illuminated (for example, refer to JP-A-2017-214822, JP-A-2017-161692, and JP-A-2017-151249).

Here, the inventor of the present invention considers suppressing deterioration in cooling efficiency without allowing direct light to be taken into the room by retro-reflecting the direct light in the summer, and improving, for example, heating efficiency by using the direct light in the room in the winter. The inventor of the present invention makes an effort to cause both a window that does not allow the direct light to be taken into the room such as a retro-reflective window and a window that uses the direct light in the room such as an indoor use window to be compatible with each other. With respect to this point, the inventor of the present invention assumes that, for example, a state in which the direct light is not taken into the room and a state in which the direct light is used in the room can be switched by a user manipulation.

However, when the state in which the direct light is not taken into the room and the state in which the direct light is used in the room are switched by the user manipulation, the states cannot be switched unless the user is in an environment where the user can perform the manipulation. For example, while the inventor of the present invention assumes that the states are switched by performing a window reversing manipulation or a switch manipulation, it may not be easy to perform the manipulation in a case where the furniture gets in the way.

SUMMARY OF INVENTION

Aspect of non-limiting embodiments of the present disclosure relates to provide a multistage prism window in which both a state in which direct light is not taken into a room and a state in which the direct light is used in the room can be compatible with each other without requiring a user manipulation.

According to a first aspect of the present disclosure, there is provided a multistage prism window including a first transparent plate material, a second transparent plate material, a first prism, a non-transmissive member, a second prism, and a heat absorption member. The first prism collects, onto the non-transmissive member, light whose angle with respect to a normal line of the first and second transparent plate materials is equal to or greater than a first predetermined angle to put an optical path to the room in a blocked state. The second prism collects, onto the heat absorption member, light whose angle with respect to the normal line is smaller than the first predetermined angle and equal to or greater than a second predetermined angle.

According to a second aspect of the present disclosure, there is provided a multistage prism window including a first transparent plate material, a second transparent plate material, a first prism, a non-transmissive member, a second prism, and a reflection member. The first prism collects, onto the non-transmissive member, light whose angle with respect to a normal line of the first and second transparent plate materials is equal to or greater than a first predetermined angle to put an optical path to the room in a blocked state. The second prism collects, onto the reflection member, light whose angle with respect to the normal line is smaller than the first predetermined angle and equal to or greater than a second predetermined angle to reflect the collected light to the room side.

BRIEF DESCRIPTION OF DRAWINGS

Exemplary embodiment(s) of the present invention will be described in detail based on the following figures, wherein.

DESCRIPTION OF EMBODIMENTS

Hereinafter, exemplary embodiments of the present invention will be described. The present invention is not limited to the embodiments described below.

In the embodiments described below, illustration and description of a part of the configuration are omitted in some cases. With respect to details of an omitted technology, it goes without saying that a publicly known or well-known technology is appropriately applied within a scope where contradiction with contents described below does not occur.

Figure 1:
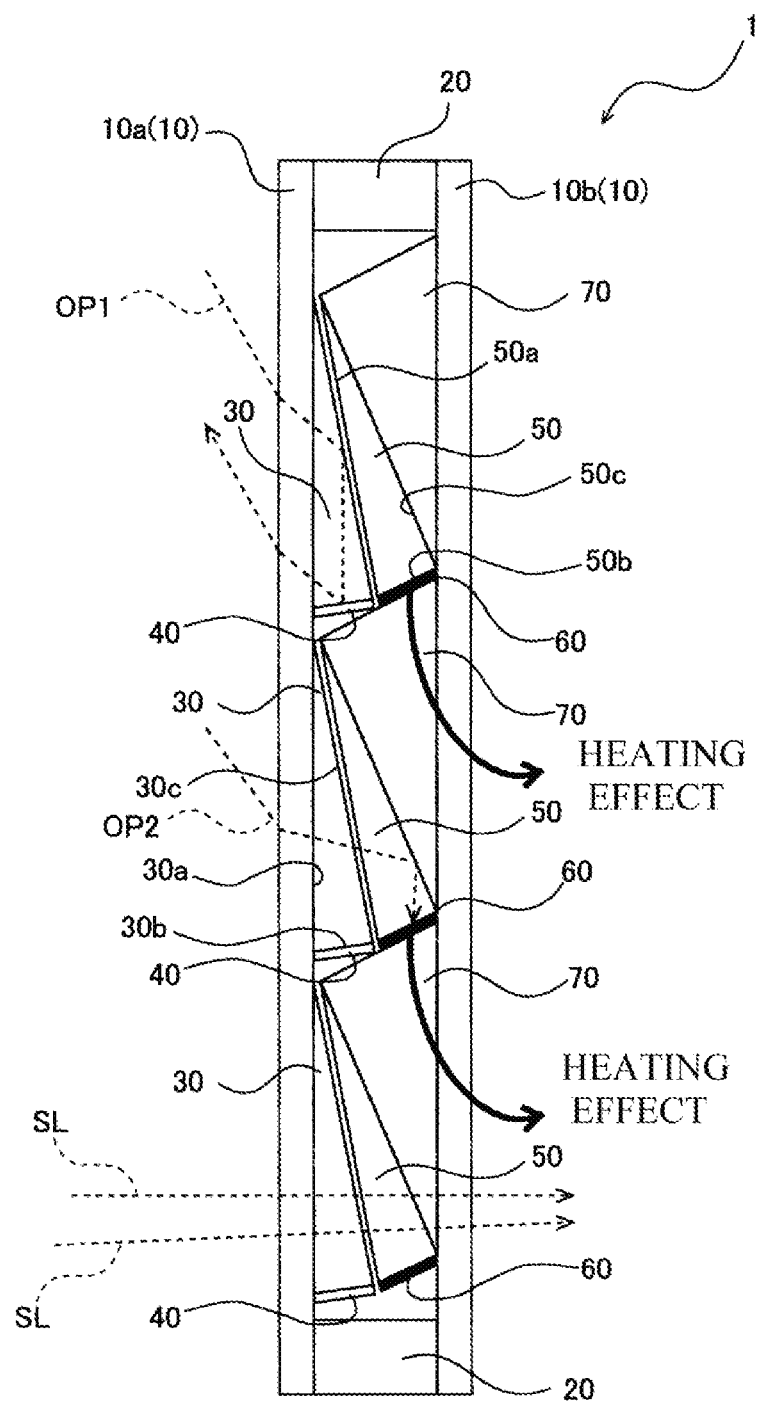
FIG. 1 is a cross-sectional view illustrating a multistage prism window according to a first embodiment of the present invention.

FIG. 1 is a cross-sectional view illustrating a multistage prism window according to a first embodiment of the present invention. A multistage prism window 1 illustrated in FIG. 1 approximately includes two transparent plate materials 10, a vacuum sealing member 20, a plurality of first prisms 30, a plurality of reflection members (non-transmissive members) 40, a plurality of second prisms 50, a plurality of heat absorption members 60, and a plurality of image restoration prisms 70.

The two transparent plate materials 10 are transparent plate materials such as a glass material and a resin material that are disposed substantially in parallel to each other. The two transparent plate materials 10 includes a first transparent plate material 10a and a second transparent plate material 10b. The first transparent plate material 10a is disposed on an outdoor side, and the second transparent plate material 10b is disposed closer to a room side than the first transparent plate material 10a.

The vacuum sealing member 20 is interposed between the two transparent plate materials 10 at peripheral end portions of the two transparent plate materials 10. The vacuum sealing member 20 is provided at the peripheral end portions of the two transparent plate materials 10, and thus an internal space closed by the two transparent plate materials 10 and the vacuum sealing member 20 is formed.

The plurality of first prisms 30 are disposed in the internal space between the two transparent plate materials 10, and each of the plurality of first prisms 30 is configured with a prism that is formed of a transparent member having a triangular shape when viewed in a cross section (that is, a prism having a triangular prism shape). These first prisms 30 are disposed facing the first transparent plate material 10a so that a first side 30a is disposed along the first transparent plate material 10a (in the first embodiment, the first prisms 30 are disposed in contact with the first transparent plate material 10a). A second side 30b and a third side 30c of the first prism 30 extend at a predetermined angle with respect to the first side 30a. The second side 30b is a side located on a vertically lower side than the third side 30c. The first prism 30 may be disposed to be slightly separated from the first transparent plate material 10a.

The reflection member 40 is a member that does not allow sunlight to be transmitted, and in the embodiment, for example, is a member whose reflectance of visible light and infrared light is 70% or more. The reflection member 40 is provided in a state of being in contact with the second side 30b of the first prism 30 (predetermined surface). The reflection member 40 may be provided in a state of being separated from the first prism 30. It is desirable that the reflection member 40 is formed by performing mirror surface processing (silver processing) on the second side 30b of the first prism 30.

The plurality of second prisms 50 are disposed closer to the room side than the first prism 30 in the internal space between the two transparent plate materials 10, and each of the plurality of second prisms 50 is configured with a prism that is formed of a transparent member having a triangular shape when viewed in a cross section (that is, a prism having a triangular prism shape). Each of these second prisms 50 is provided with respect to each first prism 30, and the first side 50a is disposed along the third side 30c of the first prism 30. A second side 50b and a third side 50c of the second prism 50 extend at a predetermined angle with respect to the first side 50a. The second side 50b is a side located on a vertically lower side than the third side 50c. In the embodiment, the second prism 50 is disposed to be slightly separated from the first prism 30.

The heat absorption member 60 is, for example, a member whose absorption rate of visible light and infrared light is 70% or more, and corresponds to, for example, a selective absorption member in which the absorption rate is large in a solar wavelength range (0.3 to 2.5 µm) and an emissivity is small in an infrared wavelength range (3.0 to 20 µm). The heat absorption member 60 is provided in a state of being in contact with the second side 50b (predetermined surface) of the second prism 50. The heat absorption member 60 may be formed by performing absorption film processing on the second side 50b of the second prism 50, or may be simply formed with a black member.

The image restoration prism 70 is a prism installed so as to fill a space where the first and second prisms 30 and 50 are not provided in the internal space between the two transparent plate materials 10. In the embodiment, each image restoration prism 70 is provided for each combination of the first prism 30 and the second prism 50. The image restoration prism 70 is set to about a size of an area (for example, ±10%) obtained by adding one first prism 30 and one second prism 50 when viewed in a cross section. When refractive indices of the first prism 30, the second prism 50, and the image restoration prism 70 are equal to each other, the sum of an angle formed by the first side 30a and the third side 30c of the first prism 30 and an angle formed by the first side 50a and the third side 50c of the second prism 50 is substantially the same as an angle of an internal angle of a lower end of the image restoration prism. This enables image restoration.

Figure 2:
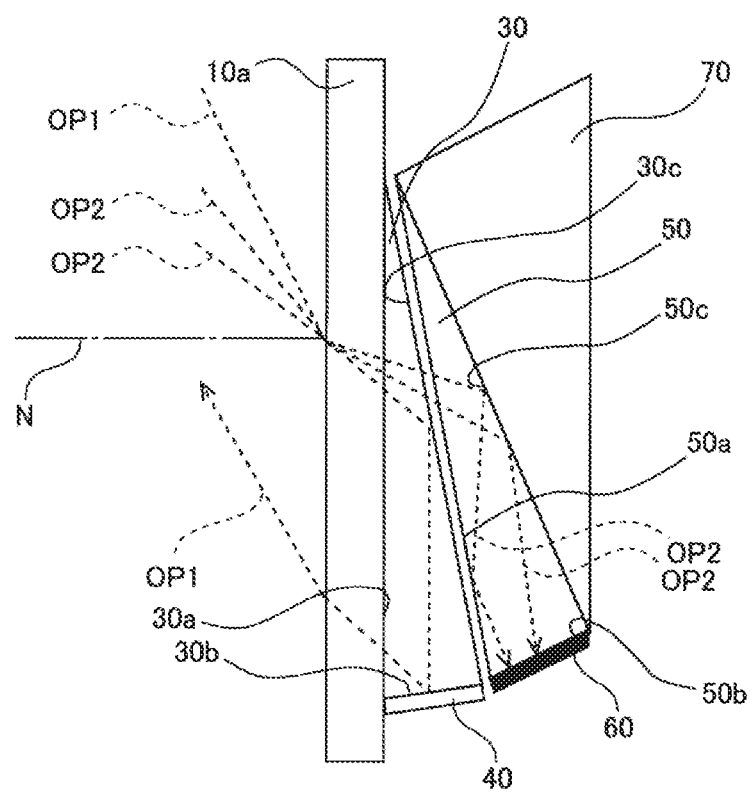
FIG. 2 is a conceptual diagram illustrating optical paths of direct light incident on the multistage prism window according to the first embodiment.
Figure 3:
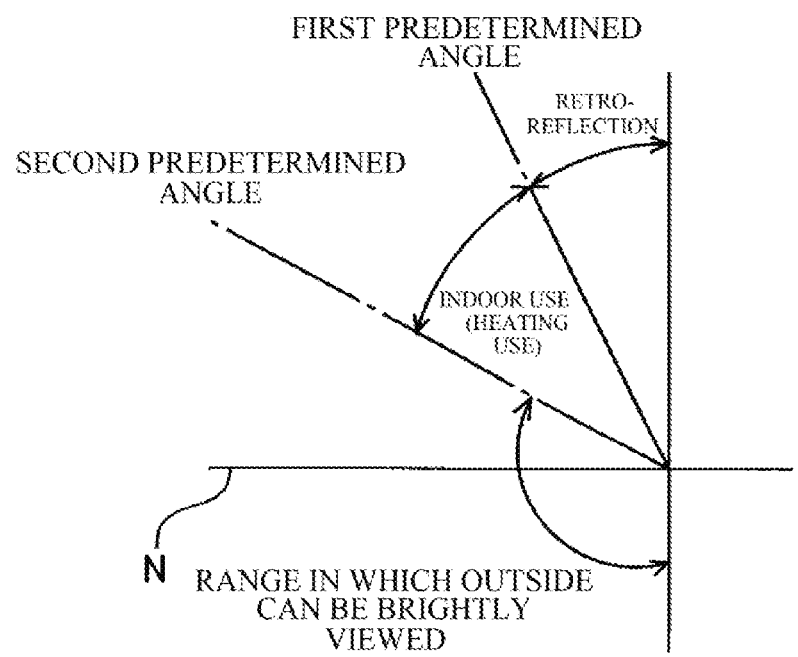
FIG. 3 is a conceptual diagram illustrating a result of light incident on the multistage prism window according to the first embodiment.

FIG. 2 is a conceptual diagram illustrating optical paths of direct light incident on the multistage prism window 1 according to the first embodiment, and FIG. 3 is a conceptual diagram illustrating a result of light incident on the multistage prism window 1 according to the first embodiment.

As illustrated in FIGS. 2 and 3, a refractive index and a triangular internal angle of the first prism 30 in the embodiment are set so that direct light OP1 whose angle with respect to a normal line N of the two transparent plate materials 10 is equal to or greater than a first predetermined angle (for example, direct light when a sun altitude in the summer is high) is collected on the reflection member 40 and is retro-reflected in a state where an optical path to the room is blocked. More specifically, the refractive index and the triangular internal angle of the first prism 30 are set so that an incident angle of the direct light OP1 on the third side 30c is equal to or greater than a critical angle. When the reflection member 40 is provided to be separated from the second side 30b, the refractive index and the triangular internal angle of the first prism 30 are set so that an incident angle of the direct light OP1 on the second side 30b is smaller than the critical angle.

The refractive index and the triangular internal angle of the first prism 30 are set so that light whose angle with respect to the normal line N is smaller than the first predetermined angle (direct light OP2 and light SL such as reflected light from the ground which will be described later (refer to FIG. 1)) is allowed to be transmitted.

The direct light OP1 illustrated in FIG. 2 first reaches the third side 30c of the first prism 30, but when the refractive index and the triangular internal angle are set as described above, the direct light OP1 is retro-reflected in the same manner even though the direct light OP1 is direct light that first reaches the second side 30b.

A refractive index and a triangular internal angle of the second prism 50 in the embodiment are set so that the direct light OP2 (for example, direct light when the sun altitude in the winter is low) whose angle with respect to the normal line N is smaller than the first predetermined angle and is equal to or greater than a second predetermined angle (an angle smaller than the first predetermined angle) is collected on the heat absorption member 60, and the collected light is used for indoor heating. More specifically, the refractive index and the triangular internal angle of the second prism 50 are set so that an incident angle of the direct light OP2 transmitted through the first prism 30 on the third side 50C is equal to or greater than the critical angle. The refractive index and the triangular internal angle of the second prism 50 are set so that the incident angle thereof is equal to or greater than the critical angle even when the direct light OP2 is totally reflected on the third side 50C and is incident on the first side 50a.

The refractive index and the triangular internal angle of the second prism 50 are set so that the light SL (refer to FIG. 1) such as reflected light from the ground whose angle with respect to the normal line N is smaller than the second predetermined angle is allowed to be transmitted.

The direct light OP2 illustrated in FIG. 2 first reaches the third side 50c of the second prism 50, but is not limited thereto, and the direct light OP2 transmitted through the first prism 30 may directly reach the second side 50b.

Next, how the multistage prism window 1 according to the embodiment works will be described with reference to FIGS. 1 to 3.

First, it is assumed that the direct light OP1 whose angle with respect to the normal line N is equal to or greater than the first predetermined angle is incident on the first transparent plate material 10a. At this time, the direct light OP1 is transmitted through the first transparent plate material 10a and reaches the first prism 30. The direct light OP1 reaching the first prism 30 includes the following 1) to 3): 1) the direct light OP1 is totally reflected only on the third side 30c and reaches the reflection member 40 provided on the second side 30b; 2) the direct light OP1 is totally reflected on the first side 30a after being totally reflected on the third side 30c, and reaches the reflection member 40 provided on the second side 30b; and 3) the direct light OP1 directly reaches the reflection member 40 provided on the second side 30b. All of these lights are retro-reflected by using the reflection at the reflection member 40. That is, the light is emitted from the first transparent plate material 10a toward the sun.

It is assumed that the direct light OP2 whose angle with respect to the normal line N is smaller than the first predetermined angle and is equal to or greater than the second predetermined angle is incident on the first transparent plate material 10a. At this time, the direct light OP2 is transmitted through the first transparent plate material 10a and the first prism 30, and reaches the second prism 50. The direct light OP2 reaching the second prism 50 includes the following 1) to 3): 1) the direct light OP2 is totally reflected only on the third side 50c and reaches the heat absorption member 60 provided on the second side 50b; 2) the direct light OP2 is further totally reflected on the first side 50a and reaches the heat absorption member 60 provided on the second side 50b; and 3) the direct light OP2 directly reaches the heat absorption member 60 provided on the second side 50b. All of these lights are absorbed by the heat absorption member 60, and heat the image restoration prism 70 in contact with the heat absorption member 60. Since the image restoration prism 70 is in contact with the second transparent plate material 10b, the second transparent plate material 10b is also heated. As a result, radiant heating is performed from the second transparent plate material 10b, and thus the indoor heating is performed.

It is assumed that the light SL whose angle with respect to the normal line N is smaller than the second predetermined angle is incident on the first transparent plate material 10a. At this time, the light SL reaches the room via the first transparent plate material 10a, the first prism 30, the second prism 50, the image restoration prism 70, and the second transparent plate material 10b. Therefore, the scenery is visually recognized. Since the multistage prism window 1 according to the embodiment includes the image restoration prism 70, the scenery through the multistage prism window 1 is visually recognized with slight distortion.

Here, it is assumed that the first prism 30 and the second prism 50 have a refractive index of 1.41, and a cross section thereof when viewed in a cross section is a right triangle in which an angle formed by the second side 30b and the third side 30c and an angle formed by the second side 50b and the third side 50c are right angles. It is assumed that an angle formed by the first side 30a and the third side 30c of the first prism 30 is 8 degrees. It is assumed that an angle formed by the first side 50a and the third side 50c of the second prism 50 is 18 degrees. At this time, the first predetermined angle is 58 degrees and the second predetermined angle is 28 degrees. Therefore, the direct light OP1 whose angle with respect to the normal line N is equal or greater than 58 degrees is retro-reflected, and the direct light OP2 whose angle with respect to the normal line N is smaller than 58 degrees and equal to or greater than 28 degrees is used for the indoor heating.

In this manner, with the multistage prism window 1 according to the first embodiment, since the first prism 30 is provided to retro-reflect the light whose angle with respect to the normal line N of the first and second transparent plate materials 10a and 10b is equal to or greater than the first predetermined angle by using the reflection member 40, for example, it is possible to retro-reflect sunlight whose elevation angle becomes large such as direct light in the summer without allowing the sunlight to be taken into the room. Since the second prism 50 is provided to use the light whose angle with respect to the normal line N is smaller than the first predetermined angle and is equal to or greater than the second predetermined angle for the indoor heating by using the heat absorption member 60, heat can be absorbed by the heat absorption member 60 using sunlight whose elevation angle is relatively small such as direct light in the winter, and thus the indoor heating can be performed by using the obtained heat. Therefore, both a state in which the direct light is retro-reflected and a state in which the direct light is used in the room can be compatible with each other without requiring a user manipulation.

Since the image restoration prism 70 is in contact with the second transparent plate material 10b and the heat absorption member 60 is in contact with the image restoration prism 70, the heat of the heat absorption member 60 reaches the second transparent plate material 10b through the image restoration prism 70, and the room side can be heated from the second transparent plate material 10b.

Since the first prism 30 and the second prism 50 are separated from each other, and the second prism 50 is provided in a state of being in contact with the heat absorption member 60, the second prism 50, the heat absorption member 60, the image restoration prism 70, and the second transparent plate material 10b are in a state of being in contact with each other, thereby making it possible to easily perform manufacturing.

Since the second prism 50 is also in contact with the heat absorption member 60 in the first embodiment, the second prism 50 is also heated. Therefore, from a viewpoint of preventing heal transfer to the second prism 50, the heal absorption member 60 may not be configured with a selective absorption member, and may be simply configured with a black member.

In the first embodiment, it is desirable to perform adiabatic LowE (Low Emissivity, Low emission) processing that transmits near infrared rays to the first side 50a of the second prism 50 and reflects far infrared rays. This is because it is possible to suppress a situation in which the room side is heated by heat rays from the light SL such as scattered light in the summer.

Next, a second embodiment of the present invention will be described. A multistage prism window according to the second embodiment is similar to that of the first embodiment, but some configurations therebetween are different. In the following description, elements that are the same as or similar to those of the first embodiment will be denoted by the same reference signs, and the description thereof will be omitted.

Figure 4:
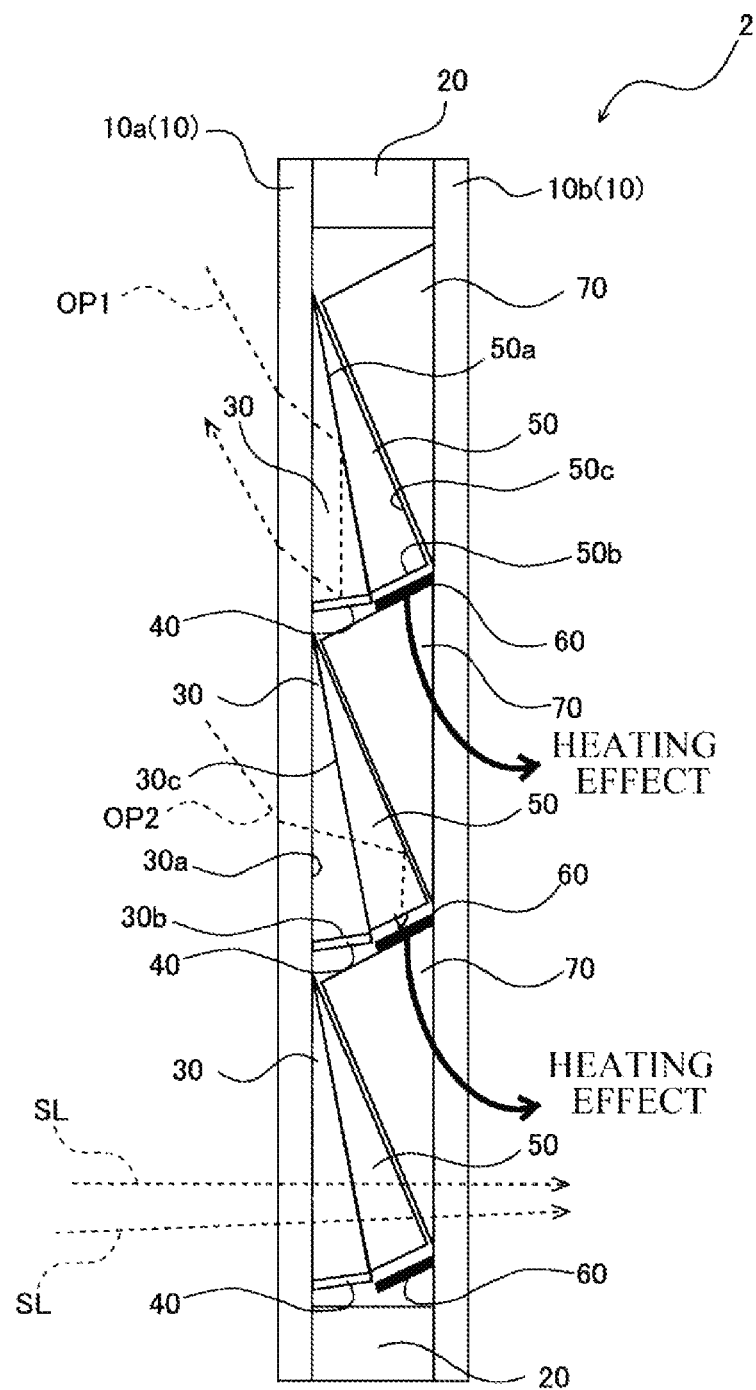
FIG. 4 is a cross-sectional view illustrating a multistage prism window according to a second embodiment.

FIG. 4 is a cross-sectional view illustrating the multistage prism window according to the second embodiment. In a multistage prism window 2 illustrated in FIG. 4, the first prism 30 and the second prism 50 are in a state of being in contact with each other. The second prism 50 and the image restoration prism 70 are disposed with a minute gap. The heat absorption member 60 is in contact with the image restoration prism 70, but is not in contact with the second side 50b (predetermined surface) of the second prism 50 and is provided in a state of being separated from the second side 50b. The heat absorption member 60 may or may not be in contact with the second transparent plate material 10b.

Next, how the multistage prism window 2 according to the embodiment works will be described with reference to FIG. 4.

First, it is assumed that the direct light OP1 whose angle with respect to the normal line N is equal to or greater than the first predetermined angle is incident on the first transparent plate material 10a. At this time, the direct light OP1 is retro-reflected in the same manner as that of first embodiment.

It is assumed that the direct light OP2 whose angle with respect to the normal line N is smaller than the first predetermined angle and equal to or greater than the second predetermined angle is incident on the first transparent plate material 10a. At this time, the direct light OP2 is transmitted through the first transparent plate material 10a and the first prism 30, and reaches the second prism 50. The direct light OP2 reaching the second prism 50 includes the following 1) to 3): 1) the direct light OP2 is transmitted through the second side 50b after being totally reflected only on the third side 50c, and reaches the heat absorption member 60; 2) the direct light OP2 is totally reflected on the first side 50a after being totally reflected on the third side 50c, transmitted through the second side 50b, and reaches the heat absorption member 60; and 3) the direct light OP2 is transmitted through the second side 50b after directly reaching the second side 50b, and reaches the heat absorption member 60. Therefore, in the second prism 50 according to the second embodiment, in order to achieve the optical paths of the above-described 1) to 3), the refractive index and the triangular internal angle are set so that the incident angle of the direct light OP2 that reaches the second side 50b is smaller than the critical angle, in addition to a fact that the direct light OP2 is totally reflected on the first and third sides 50a and 50c.

All the lights described above in 1) to 3) are absorbed by the heat absorption member 60, and heat the image restoration prism 70 in contact with the heat absorption member 60. Since the image restoration prism 70 is in contact with the second transparent plate material 10b, the second transparent plate material 10b is also heated. As a result, the radiant heating is performed from the second transparent plate material 10b, and thus the indoor heating is performed.

The light SL whose angle with respect to the normal line N is smaller than the second predetermined angle reaches the room in the same manner as that of the first embodiment.

As described above, with the multistage prism window 2 according to the second embodiment, in the same manner as that of the first embodiment, both the state in which the direct light is retro-reflected and the state in which the direct light is used in the room can be compatible with each other without requiring the user manipulation. The room side can be heated from the second transparent plate material 10b.

According to the second embodiment, since the second prism 50 is provided in a state of being separated from the heat absorption member 60, the heat of the heat absorption member 60 becomes hard to escape to the second prism 50, and is easily transferred to the second transparent plate material 10b through the image restoration prism 70. Therefore, a heating effect of the room can be improved.

In the second embodiment, it is desirable to perform infrared ray absorption LowE processing on two sides of the image restoration prism 70 that are not in contact with the second transparent plate material 10b. This is because it is possible to suppress heat radiation to the outside of the room in the winter.

Next, a third embodiment of the present invention will be described. A multistage prism window according to the third embodiment is similar to that of the first embodiment, but some configurations therebetween are different. In the following description, elements that are the same as or similar to those of the first embodiment will be denoted by the same reference signs, and the description thereof will be omitted.

Figure 5:
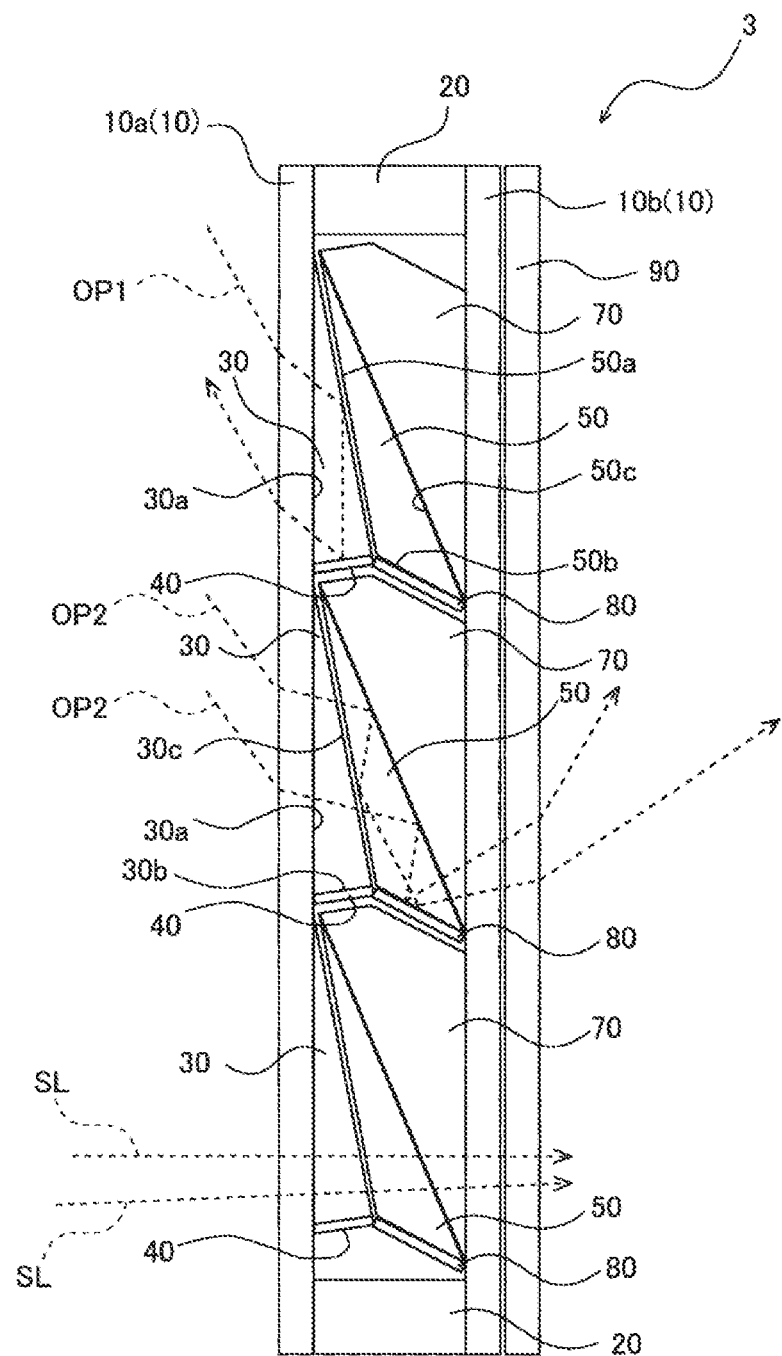
FIG. 5 is a cross-sectional view illustrating a multistage prism window according to a third embodiment.

FIG. 5 is a cross-sectional view illustrating the multistage prism window according to the third embodiment. In a multistage prism window 3 illustrated in FIG. 5, a shape of the second prism 50 is different from that of the first embodiment, and is an obtuse triangle when viewed in a cross section. The second prism 50 is disposed so that an obtuse angle portion faces the outdoor side, and the second side 50b on the lower side is in a state of being slightly inclined toward the room side. The second prism 50 is disposed with a minute gap from the first prism 30. In the embodiment, the second prism 50 is disposed with the minute gap from the first prism 30, but the second prism 50 is not limited thereto, and may be in contact with the first prism 30.

In the third embodiment, the image restoration prism 70 is formed into a quadrangular shape when viewed in a cross section in accordance with the shape of the second prism 50 having an obtuse triangular shape.

The multistage prism window 3 according to the third embodiment does not include the heat absorption member 60, but includes a second reflection member (reflection member) 80. The second reflection member 80 is a member which is the same as the reflection member (non-transmissive member) 40, and is provided in a state of being in contact with the second side 50b of the second prism 50. The second reflection member 80 may be provided in a state of being separated from the second prism 50.

In the third embodiment, the refractive index and the triangular internal angle of the second prism 50 are appropriately set, and the direct light OP2 whose angle with respect to the first transparent plate material 10a is smaller than the first predetermined angle and equal to or greater than the second predetermined angle is guided to an indoor ceiling side. Specifically, the refractive index and the triangular internal angle of the second prism 50 are set so as to satisfy the following 1) to 4).

First, 1) the second prism 50 is set so that the incident angle of the direct light OP2 on the third side 50c is equal to or greater that the critical angle. Further, 2) The second prism 50 is set so that the incident angle of the direct light OP2 is equal to or greater than the critical angle when the direct light OP2 totally reflected on the third side 50c reaches the first side 50a. Still further, 3) The second prism 50 is set so that the incident angle thereof is smaller than the critical angle, whereby the direct light OP2 that reaches the second reflection member 80 through the reflection on the third side 50c and/or the first side 50a and then is reflected thereon should be emitted from the second transparent plate material 10b. In addition, 4) The second prism 50 is set so that regarding the direct light OP2 that is reflected on the second reflection member 80 after being totally reflected on the third side 50c and the first side 50a, when the angle with respect to the normal line N is equal to or greater than 28 degrees, the direct light OP2 is emitted at an angle equal to or greater than the horizontal.

As the second prism 50 that satisfies the above-described 1) to 4), for example, the refractive index is 1.41, the angle formed by the first side 50a and the third side 50c is 23 degrees, and the angle formed by the second reflection member 80 and the horizontal line (the same as the normal line N illustrated in FIG. 2) is 30 degrees.

The multistage prism window 3 according to the third embodiment includes a third transparent plate material 90 on the room side of the second transparent plate material 10b. The third transparent plate material 90 is disposed with a predetermined gap from the second transparent plate material 10b. A space between the third transparent plate material 90 and the second transparent plate material 10b is, for example, in a vacuum state from a viewpoint of heat insulation.

Next, how the multistage prism window 3 according to the third embodiment works will be described with reference to FIG. 5.

First, it is assumed that the direct light OP1 whose angle with respect to the normal line N is equal to or greater than the first predetermined angle is incident on the first transparent plate material 10a. At this time, the direct light OP1 is retro-reflected in the same manner as that of the first embodiment.

It is assumed that the direct light OP2 whose angle with respect to the normal line N is smaller than the first predetermined angle and equal to or greater than the second predetermined angle is incident on the first transparent plate material 10a. At this time, the direct light OP2 is transmitted through the first transparent plate material 10a and the first prism 30, and reaches the second prism 50. The direct light OP2 reaching the second prism 50 includes the following 1) to 3): 1) the direct light OP2 is totally reflected only on the third side 50c and reaches the second reflection member 80 provided on the second side 50b; 2) the direct light OP2 is further totally reflected on the first side 50a after being totally reflected on the third side 50c, and reaches the second reflection member 80 provided on the second side 50b; and 3) the direct light OP2 directly reaches the second reflection member 80 provided on the second side 50b. All of these lights are reflected on the second reflection member 80 and emitted from the side of the second transparent plate material 10b via the image restoration prism 70. At this time, the emitted light is emitted to the indoor ceiling side at an angle at least equal to or greater than the horizontal. Therefore, the ceiling side is illuminated. The second reflection member 80 emits the direct light OP2 to the indoor ceiling side in an electromagnetic wave state as it is, and thus the indoor ceiling is heated. Particularly, a recessed ceiling at a location apart from the multistage prism window 3 can be heated according to an emission angle, and thus the indoor heating is performed.

The light SL whose angle with respect to the normal line N is smaller than the second predetermined angle reaches the room in the same manner as that of the first embodiment.

As described above, the multistage prism window 3 according to the third embodiment includes the first prism 30 that retro-reflects sunlight whose angle with respect to the normal line N of the first and second transparent plate materials 10a and 10b is equal to or greater than the first predetermined angle by using the reflection member (second reflection member) 40. Therefore, with the multistage prism window 3, for example, it is possible to retro-reflect sunlight whose elevation angle becomes large such as direct light in the summer without allowing the sunlight to be taken into the room. The multistage prism window 3 includes the second prism 50 that reflects sunlight whose angle with respect to the normal line N is smaller than the first predetermined angle and equal to or greater than the second predetermined angle toward the indoor ceiling side by using the second reflection member 80. Therefore, according to the multistage prism window 3, for example, sunlight whose elevation angle is relatively small such as direct light in the winter can be taken into the room in an electromagnetic wave state as it is, and used for heating and illuminating the indoor ceiling. Therefore, both the state in which the direct light is retro-reflected and the state in which the direct light is used indoors can be compatible with each other without requiring the user manipulation.

Since the multistage prism window 3 further includes the third transparent plate material 90 that is disposed substantially parallel to the second transparent plate material 10b and disposed closer to the room side than the second transparent plate material 10b, for example, heat insulation can be further improved by putting the space between the second transparent plate material 10b and the third transparent plate material 90 in the vacuum state. Particularly, the sunlight whose elevation angle is relatively small such as the direct light in the winter is taken into the room in the electromagnetic wave state as it is, and thus the indoor heating is performed. The added third transparent plate material 90 causes the heat in the room to be hard to escape to the outside of the room, and heat insulation equal to or higher than that of a wall having a relatively high heat insulation can be achieved, thereby making it possible to contribute to the realization of a building that does not need to limit a size of a window.

Next, a fourth embodiment of the present invention will be described. A multistage prism window according to the fourth embodiment is similar to that of the first embodiment, but some configurations therebetween are different. In the following description, elements that are the same as or similar to those of the first embodiment will be denoted by the same reference signs, and the description thereof will be omitted.

Figure 6:
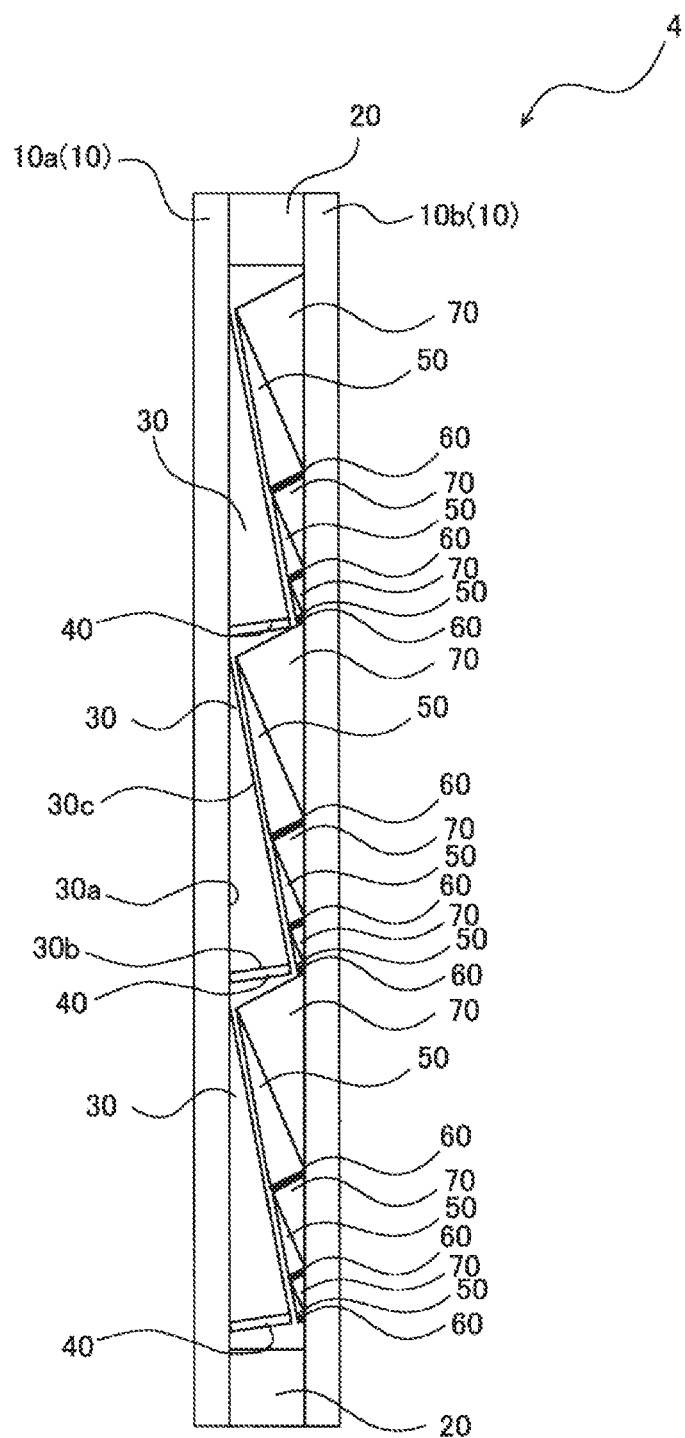
FIG. 6 is a cross-sectional view illustrating a multistage prism window according to a fourth embodiment.

FIG. 6 is a cross-sectional view illustrating the multistage prism window according to the fourth embodiment. In a multistage prism window 4 illustrated in FIG. 6, a plurality of (three in FIG. 6) second prisms 50 and image restoration prisms 70 are provided with respect to one first prism 30.

Each of the second prisms 50 and image restoration prisms 70 has different sizes, and a length (length in a vertical direction) obtained by adding the plurality of second prisms 50 and image restoration prisms 70 is substantially the same as that of one first prism 30.

Here, when the plurality of second prisms 50 and image restoration prisms 70 are configured to be provided with respect to one first prism 30, this configuration can contribute to suppressing a thickness of the plurality of second prisms 50 and image restoration prisms 70. That is, since the respective second prisms 50 and image restoration prisms 70 themselves can be made small, the thickness thereof can be suppressed, and thus it is possible to provide the multistage prism window 4 which is further miniaturized.

FIGS. 7A to 7K are manufacturing process diagrams illustrating a manufacturing method of the multistage prism window 4 according to the fourth embodiment, and FIGS. 7A to 7K respectively illustrate each process.

Figure 7:
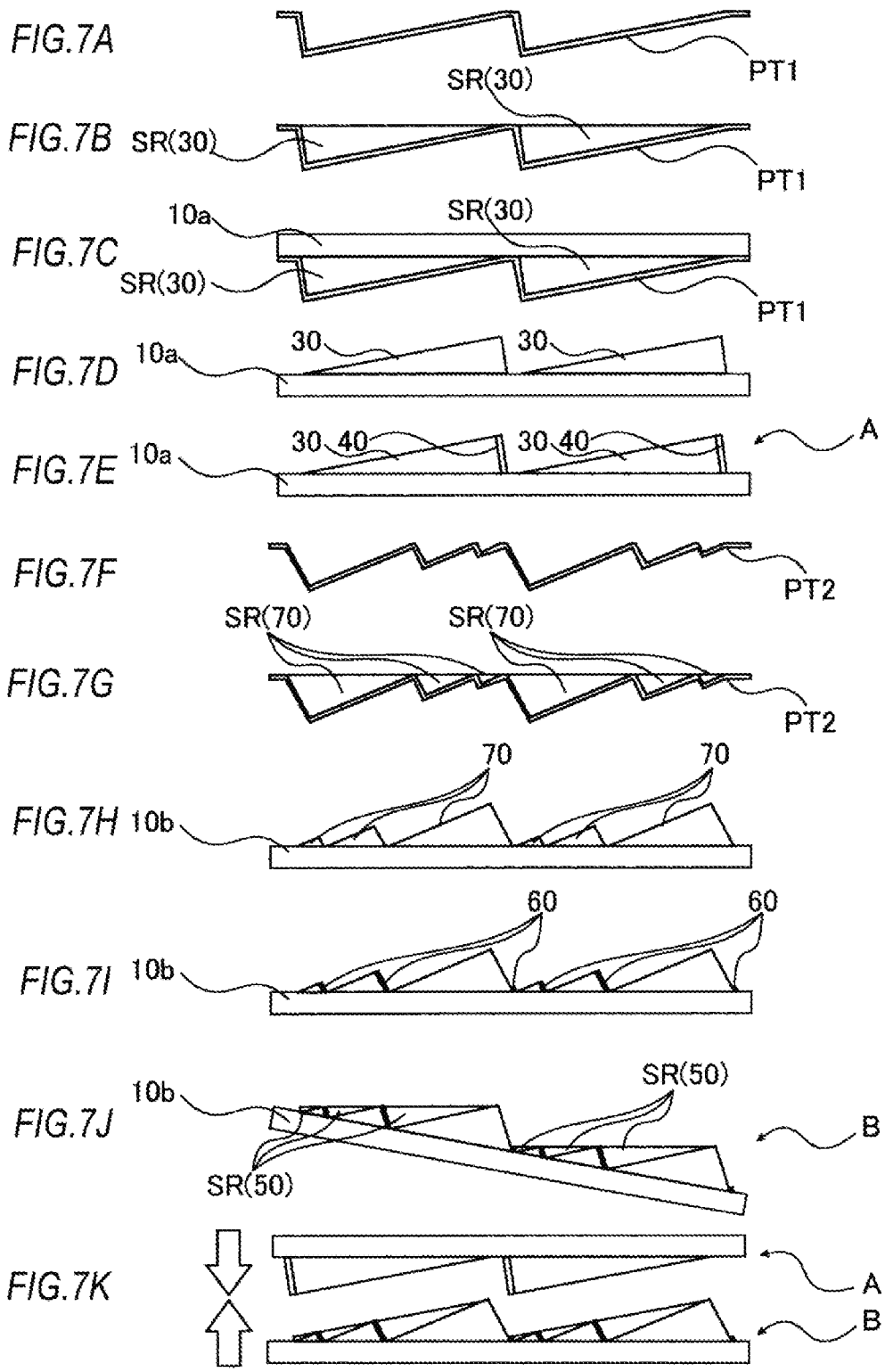
FIGS. 7A to 7K are manufacturing process diagrams illustrating a manufacturing method of the multistage prism window according to the fourth embodiment, and FIGS. 7A to 7K respectively illustrate each process.

First, as illustrated in FIG. 7A, a first prism mold PT1 coated with a release agent is prepared. The first prism mold PT1 is formed with recessed portions for producing the first prisms 30 each having the same shape.

Next, as illustrated in FIG. 7B, a liquefied silicone resin SR is poured into the first prism mold PT1. After that, as illustrated in FIG. 7C, the degreased first transparent plate material 10a (glass) is put on, and the silicone resin SR is cured by vacuum defoaming. The first prism 30 is obtained by curing.

Next, the first prism mold PT1 is removed as illustrated in FIG. 7D, and a mask pattern (not illustrated) is put on instead as illustrated in FIG. 7E, after that, the silver color processing is performed to form the reflection member 40. As described above, the production of the first member A is completed.

On the other hand, as illustrated in FIG. 7F, a second prism mold PT2 coated with a release agent is prepared. The second prism mold PT2 is formed with recessed portions for forming the plurality of image restoration prisms 70 corresponding to one first prism 30.

Next, as illustrated in FIG. 7G, a liquefied silicone resin SR is poured into the second prism mold PT2. After that, the degreased second transparent plate material 10b (glass) is put on, and the silicone resin SR is cured by vacuum defoaming. The image restoration prism 70 is obtained by curing.

Next, as illustrated in FIG. 7H, the second prism mold PT2 is removed, and a mask pattern (not illustrated) is put on instead as illustrated in FIG. 7I, after that, the absorption film processing is performed to form the heat absorption member 60. Next, a release agent is applied on the image restoration prism 70 and the heat absorption member 60, after that, as illustrated in FIG. 7J, the second transparent plate material 10b is inclined by a specified angle and the silicone resin SR is filled between the image restoration prisms 70.

Next, the silicone resin SR is cured to obtain the second prism 50, and the second prism 50 is once peeled off and then mounted again. The release agent is removed during this time. As described above, the production of the second member B is completed.

After that, as illustrated in FIG. 7K, the first member A and the second member B face each other, thereby combining both the first member A and the second member B with each other. As a result, the multistage prism window 4 according to the fourth embodiment in which the plurality of second prisms 50 and image restoration prisms 70 are provided with respect to one first prism 30 can be obtained.

In this manner, with the multistage prism window 4 according to the fourth embodiment, in the same manner as that of the first embodiment, both the state in which the direct light is retro-reflected and the state in which the direct light is used in the room can be compatible with each other without requiring the user manipulation. The room side can be heated from the second transparent plate material 10b.

Since the plurality of second prisms 50 are disposed on the room side of one first prism 30, and accordingly the second prisms 50 themselves are made small, the thickness thereof can be suppressed and thus it is possible to provide the multistage prism window 4 which is further miniaturized.

Next, a fifth embodiment of the present invention will be described. A multistage prism window according to the fifth embodiment is similar to that of the third embodiment, but some configurations therebetween are different. In the following description, elements that are the same as or similar to those of the first embodiment will be denoted by the same reference signs, and the description thereof will be omitted.

Figure 8:
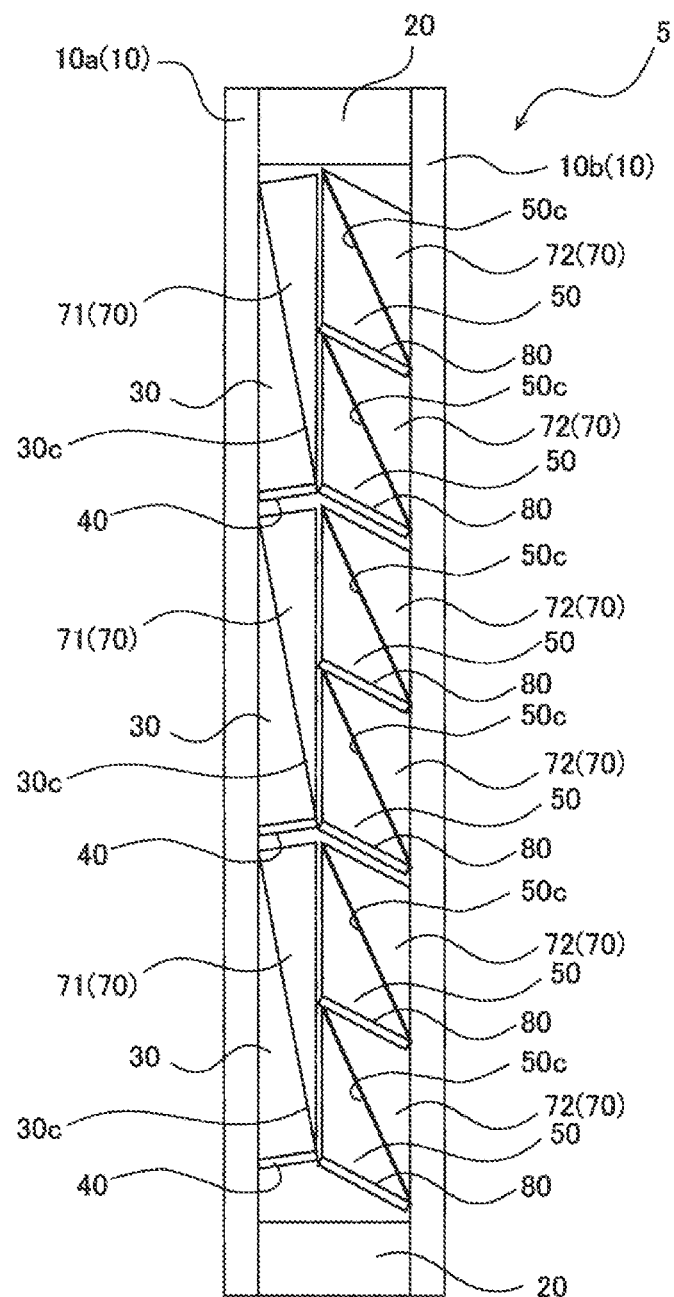
FIG. 8 is a cross-sectional view illustrating a multistage prism window according to a fifth embodiment.

FIG. 8 is a cross-sectional view illustrating the multistage prism window according to the fifth embodiment. As illustrated in FIG. 8, in a multistage prism window 5 according to the fifth embodiment, the image restoration prisms 70 include a first image restoration prisms 71 and second image restoration prisms 72.

The first image restoration prism 71 is a prism provided corresponding to the first prism 30. The first image restoration prism 71 is configured to have the same shape and the same refractive index as those of the first prism 30, and is provided in contact with the third side 30c of the first prism 30 in a state where the first prism 30 is rotated 180 degrees when viewed in a cross section.

The second image restoration prism 72 is a prism provided corresponding to the second prism 50. The second image restoration prism 72 has the same shape and the same refractive index as those of the second prism 50, and is provided in contact with the third side 50c of the second prism 50 in a state where the second prism 50 is rotated 180 degrees when viewed in a cross section.

A set of the first prism 30 and the first image restoration prism 71 is separated from a set of the second prism 50 and the second image restoration prism 72. The first prism 30 is in contact with the first transparent plate material 10a, and the second image restoration prism 72 is in contact with the second transparent plate material 10b. Two second prisms 50 and two second image restoration prisms 72 are provided with respect one set of the first prism 30 and the first image restoration prism 71.

Next, how the multistage prism window 5 according to the fifth embodiment works will be described with reference to FIG. 8.

First, in the same manner as that of the third embodiment illustrated in FIG. 5, it is assumed that the direct light OP1 whose angle with respect to the normal line N is equal to or greater than the first predetermined angle is incident on the first transparent plate material 10a. At this time, the direct light OP1 is retro-reflected in the same manner as that of the first embodiment. The direct light OP2 whose angle with respect to the normal line N is smaller than the first predetermined angle and equal to or greater than the second predetermined angle is reflected by the second reflection member 80 and emitted from the side of the second transparent plate material 10b. At this time, the emitted light is emitted to the indoor ceiling side at an angle at least equal to or greater than the horizontal. Therefore, the ceiling side is illuminated. The light SL whose angle with respect to the normal line N is smaller than the second predetermined angle reaches the room in the same manner as that of the third embodiment.

Particularly, the multistage prism window 3 according to the third embodiment does not transmit light when the angle with respect to the normal line N is within a specific angle range (for example, 20 degrees to 28 degrees when the first predetermined angle is 58 degrees and the second predetermined angle is 28 degrees), and cannot be visually recognized as a scenery. Meanwhile, in the fifth embodiment, when the first predetermined angle is designed to be 58 degrees and the second predetermined angle is designed to be 28 degrees, it can be seen that a state where the scenery cannot not be visually recognized in a certain angle range does not occur. As a result, a more appropriate window can be provided.

Figure 9:
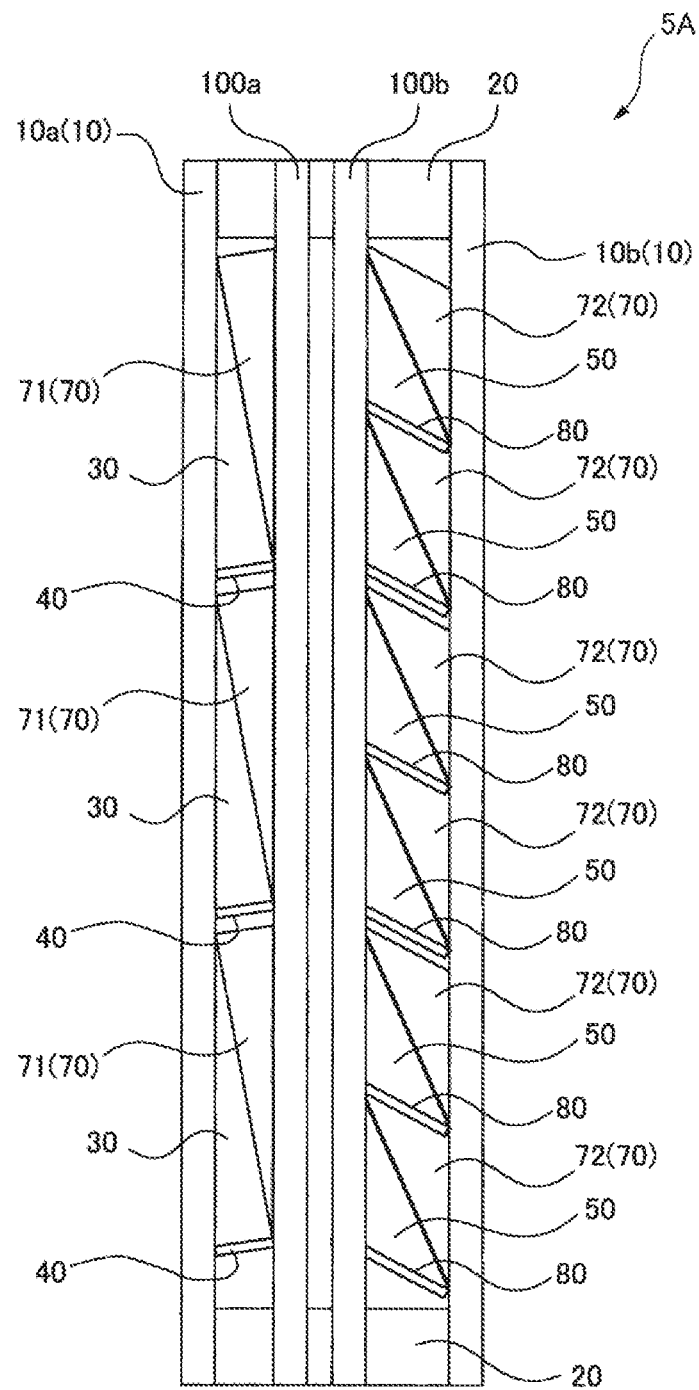
FIG. 9 is a cross-sectional view illustrating a multistage prism window according to a modification of the fifth embodiment.

FIG. 9 is a cross-sectional view illustrating a multistage prism window according to a modification of the fifth embodiment. As illustrated in FIG. 9, a multistage prism window 5A includes a fourth transparent plate material 100*a* and a fifth transparent plate material 100*b*, and these two transparent plate materials 100*a* and 100*b* are provided between the set of the first prism 30 and the first image restoration prism 71 and the set of the second prism 50 and the second image restoration prism 72. A vacuum is formed between the two transparent plate materials 100*a* and 100*b*, and a heat insulating layer may be formed therebetween.

In this manner, with the multistage prism windows 5 and 5A according to the fifth embodiment and the modification thereof, in the same manner as that of the third embodiment, both the state in which the direct light is retro-reflected and the state in which the direct light is used in the room can be compatible with each other without requiring the user manipulation.

In the fifth embodiment and the modification thereof, the first image restoration prism 71 is provided with respect to the first prism 30, and the second image restoration prism 72 is provided with respect to the second prism 50. Therefore, according to the fifth embodiment and the modification thereof, it is possible to prevent a state in which light in a certain angle range becomes difficult to be visually recognized, and thus it is possible to provide the multistage prism windows 5 and 5A which are further suitable as windows.

In the case of the configuration as shown in the modification, the heat insulating layer can be formed with a relatively simple configuration.

Next, a sixth embodiment of the present invention will be described. A multistage prism window according to the sixth embodiment is similar to that of the fifth embodiment, but some configurations therebetween are different. In the following description, elements that are the same as or similar to those of the first embodiment will be denoted by the same reference signs, and the description thereof will be omitted.

Figure 10:
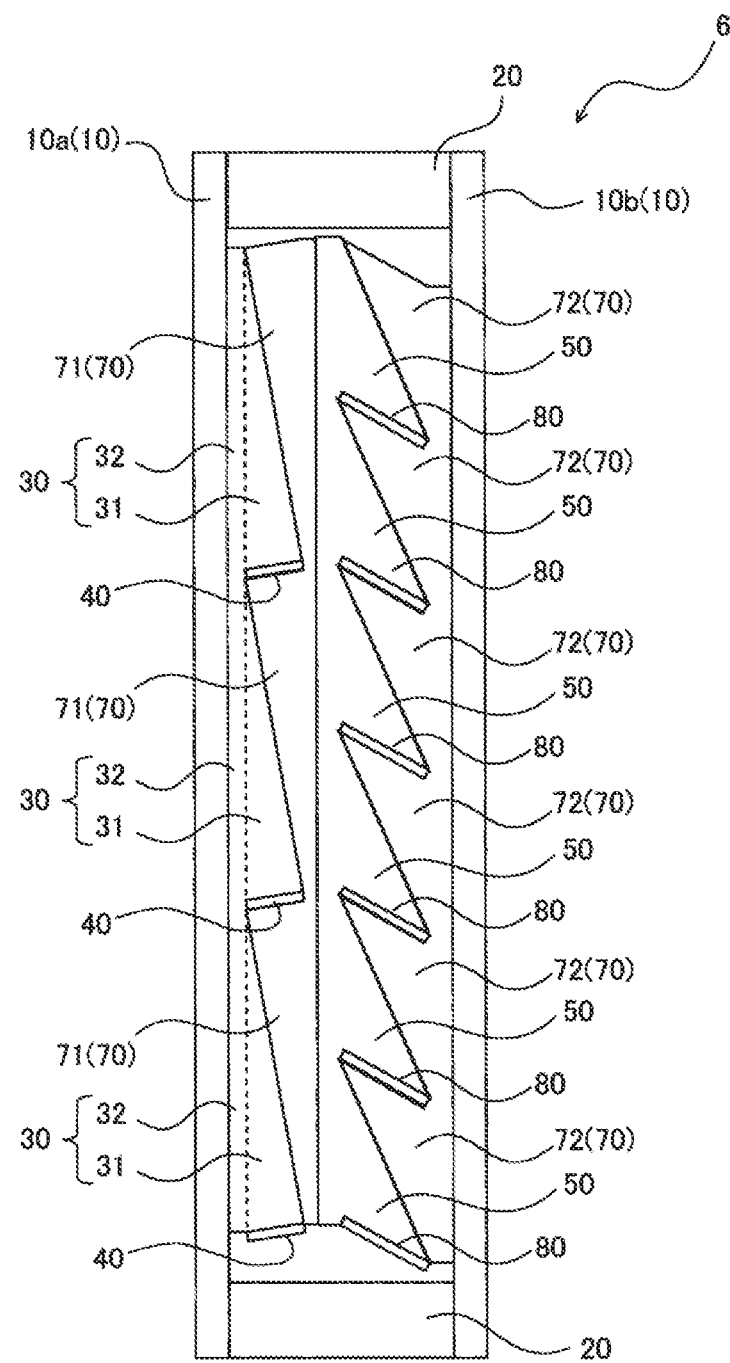
FIG. 10 is a cross-sectional view illustrating a multistage prism window according to a sixth embodiment.

FIG. 10 is a cross-sectional view illustrating the multistage prism window according to the sixth embodiment. As illustrated in FIG. 10, in a multistage prism window 6 according to the sixth embodiment, the respective prisms 30, 50, and 70 (71 and 72) are respectively configured as one prism with each of the respective prisms vertically connected to each other.

More specifically, the first prism 30 includes a plurality of triangular prism portions 31 having a triangular cross section; and a connection prism 32 that vertically connects the same sides of the plurality of triangular prism portions 31. The same applies to the second prism 50 and the image restoration prisms 70 (first image restoration prism 71 and second image restoration prism 72).

According to the above-described configuration, the plurality of prisms 30, 50, and 70 (71 and 72) in the first to fifth embodiments can be configured as one, and thus the number of prisms is reduced and assembly workability is improved.

In this manner, with the multistage prism window 6 according to the sixth embodiment, in the same manner as that of the fifth embodiment, both the state in which the direct light is retro-reflected and the state in which the direct light is used in the room can be compatible with each other without requiring the user manipulation. It is possible to prevent the state in which the light in a certain angle range becomes difficult to be visually recognized, and thus it is possible to provide the multistage prism window 6 which is further suitable as a window.

According to the sixth embodiment, it is possible to provide the multistage prism window 6 in which the number of prisms is reduced and the assembling workability is improved.

While the present invention is described above based upon the embodiments, the present invention is not limited to the above-described embodiments. Modifications may be made within a scope not departing from the spirit of the present invention, and technologies of the embodiments may be appropriately combined with each other within a possible scope. Further, publicly known or well-known technologies may be combined with each other within a possible scope.

For example, while the first and second prisms 30 and 50 are configured with solid solids in the above-described embodiments, the present invention is not limited thereto. The first and second prisms 30 and 50 may include a prism wall forming an outer wall of the prisms 30 and 50, and an internal member formed of a transparent liquid sealed inside the prism wall. The internal member may be a gel shape and a solid. The same also applies to the image restoration prism 70.

With respect to the one provided in a state of being separated from other members among the respective members 30, 40, 50, 60, 70, and 80 housed in the internal space in the above-described embodiments, it is desirable that an interposing member such as a minute column or a grain is interposed between the other members.

In the multistage prism windows 1 to 6 and 5A according to the above-described embodiments, the transparent plate material 10 has a structure of two to four layers, but the number of layers is not limited thereto.

As described in the fourth embodiment, with respect to a configuration in which the plurality of second prisms 50 and image restoration prisms 70 are provided with respect to one first prism 30, the configuration may be applied to the multistage prism windows 2 and 3 according to the second and third embodiments.

Since the multistage prism windows 3, 5, 5A, and 6 according to the third, fifth, and sixth embodiments are particularly suitable for a window at a high place corresponding to a transom, the multistage prism windows 3, 5, 5A, and 6 are used, for example, as a window that is equal to or higher than 1.8 meters (predetermined height) from the floor. On the side lower than the predetermined height, the multistage prism window 1 or 2 according to the first or second embodiment can be used to form a window in which both the multistage prism windows are combined with each other.

In addition thereto, since there is a possibility that the scenery may not be visually recognized at the high places of the multistage prism windows 1 to 6, the image restoration prism 70 may not be provided. Particularly, with respect to the multistage prism window 3 according to the third embodiment, since it is not required to heat the second transparent plate material 10b via the image restoration prism 70, the image restoration prism 70 on the upper side of the multistage prism window 3 may not be provided.

While the multistage prism windows 1 to 6 and 5A according to the first to sixth embodiments include the reflection member 40, in the case of the one that does not allow sunlight to be transmitted, for example, a solar cell panel (photoelectric conversion member) that generates power by using light energy may be provided instead of the reflection member 40. In this case, the power obtained by the solar cell panel is sent to the outside of the multistage prism windows 1 to 6 and 5A and used for operation of cooling equipment.

The multistage prism windows 1 to 6 and 5A according to the first to sixth embodiments are not limited to the case in which the reflection member 40 is replaced with the solar cell panel, and may include a heat collecting pipe (heat collecting member) that heats a heat medium by using solar heat instead of the reflection member 40. In this case, the heat medium heated by the heat collecting pipe may be used for operation of an absorption refrigerating machine, or when the heat medium is water, the heat medium may be used as hot water supply as it is.

Since the multistage prism window according to the first aspect of the present disclosure includes the first prism that collects, onto the non-transmissive member, the light whose angle with respect to the normal line of the first and second transparent plate materials is equal to or greater than the first predetermined angle to put the optical path to the room in the blocked state, sunlight whose elevation angle becomes large such as direct light in the summer can be hard to be taken into the room. Since the first aspect of the present disclosure includes the second prism that collects, onto the heat absorption member, the light whose angle with respect to the normal line is smaller than the first predetermined angle and equal to or greater than the second predetermined angle, wherein the collected light is used, heat can be absorbed by the heat absorption member by using sunlight whose elevation angle is relatively small such as direct light in the winter, and the indoor heating can be performed by using the obtained heat. Therefore, the first aspect of the present disclosure provides a multistage prism window in which both a state in which the direct light is not taken into the room and a state in which the direct light is used in the room can be compatible each other.

Since the multistage prism window according to the second aspect of the present disclosure includes the first prism that collects, onto the non-transmissive member, the sunlight whose angle with respect to the normal line of the first and second transparent plate materials is equal to or greater than the first predetermined angle to put the optical path to the room in the blocked state, sunlight whose elevation angle becomes large such as direct light in the summer can be prevented from being taken into the room. Since the second aspect of the present disclosure includes the second prism that reflects the sunlight whose angle with respect to the normal line is smaller than the first predetermined angle and equal to or greater than the second predetermined angle to the room side by using the reflection member, sunlight whose elevation angle is relatively small such as direct light in the winter can be taken into the room in an electromagnetic wave state as it is, and for example, can be used for heating and illuminating an indoor ceiling. Therefore, the second aspect of the present disclosure provides a multistage prism window in which both a state in which the direct light is not taken into the room and a state in which the direct light is used in the room can be compatible with each other.

The foregoing description of the exemplary embodiments of the present invention has been provided for the purposes of illustration and description. It is not intended to be exhaustive or to limit the invention to the precise forms disclosed. Obviously, many modifications and variations will be apparent to practitioners skilled in the art. The embodiments were chosen and described in order to best explain the principles of the invention and its practical applications, thereby enabling others skilled in the art to understand the invention for various embodiments and with the various modifications as are suited to the particular use contemplated. It is intended that the scope of the invention be defined by the following claims and their equivalents.

What is claimed is:

1. A multistage prism window comprising:
   a first transparent plate material;
   a second transparent plate material that is disposed substantially parallel to the first transparent plate material and disposed closer to a room side than the first transparent plate material;
   a first prism disposed between the first and second transparent plate materials;
   a non-transmissive member that is provided in a state of being in contact with or being separated from a predetermined surface of the first prism and that does not allow sunlight to be transmitted;
   a second prism disposed closer to the room side than the first prism between the first and second transparent plate materials; and
   a heat absorption member provided in a state of being in contact with or being separated from a predetermined surface of the second prism,
   wherein the first prism collects, onto the non-transmissive member, light whose angle with respect to a normal line of the first and second transparent plate materials is equal to or greater than a first predetermined angle to put an optical path to the room in a blocked state, and transmits light whose angle with respect thereto is smaller than the first predetermined angle, and
   the second prism collects, onto the heat absorption member, light whose angle with respect to the normal line is smaller than the first predetermined angle and equal to or greater than a second predetermined angle, and transmits light whose angle with respect thereto is smaller than the second predetermined angle.

2. The multistage prism window according to claim 1,
   wherein the non-transmissive member is a reflection member that reflects the light, and
   the first prism collects, onto the reflection member, the light whose angle with respect to the normal line of the first and second transparent plate materials is equal to or greater than the first predetermined angle, and retro-reflects the collected light.

3. The multistage prism window according to claim 2, further comprising:
   an image restoration prism installed so as to fill a space where the first prism and the second prism are not provided in a space between the first and second transparent plate materials,
   wherein the image restoration prism includes a first image restoration prism provided corresponding to the first prism and a second image restoration prism provided corresponding to the second prism.

4. The multistage prism window according to claim 1,
wherein the non-transmissive member is a photoelectric conversion member that generates power by using light energy, and
the first prism collects, onto the photoelectric conversion member, the light whose angle with respect to the normal line of the first and second transparent plate materials is equal to or greater than the first predetermined angle, and generates power.

5. The multistage prism window according to claim 4, further comprising:
an image restoration prism installed so as to fill a space where the first prism and the second prism are not provided in a space between the first and second transparent plate materials,
wherein the image restoration prism includes a first image restoration prism provided corresponding to the first prism and a second image restoration prism provided corresponding to the second prism.

6. The multistage prism window according to claim 1,
wherein the non-transmissive member is a heat collecting member that heats a heat medium by using solar heat, and
the first prism collects, onto the heat collecting member, the light whose angle with respect to the normal line of the first and second transparent plate materials is equal to or greater than the first predetermined angle, and heats the heat medium.

7. The multistage prism window according to claim 6, further comprising:
an image restoration prism installed so as to fill a space where the first prism and the second prism are not provided in a space between the first and second transparent plate materials,
wherein the image restoration prism includes a first image restoration prism provided corresponding to the first prism and a second image restoration prism provided corresponding to the second prism.

8. A multistage prism window comprising:
a first transparent plate material;
a second transparent plate material that is disposed substantially parallel to the first transparent plate material and disposed closer to a room side than the first transparent plate material;
a first prism disposed between the first and second transparent plate materials;
a non-transmissive member that is provided in a state of being in contact with or being separated from a predetermined surface of the first prism and that does not allow sunlight to be transmitted;
a second prism disposed closer to the room side than the first prism between the first and second transparent plate materials; and
a reflection member provided in a state of being in contact with or being separated from a predetermined surface of the second prism,
wherein the first prism collects, onto the non-transmissive member, light whose angle with respect to a normal line of the first and second transparent plate materials is equal to or greater than a first predetermined angle to put an optical path to the room in a blocked state, and transmits light whose angle with respect thereto is smaller than the first predetermined angle, and
the second prism collects, onto the reflection member, light whose angle with respect to the normal line is smaller than the first predetermined angle and equal to or greater than a second predetermined angle to reflect the collected light to the room side, and transmits light whose angle with respect thereto is smaller than the second predetermined angle.

9. The multistage prism window according to claim 8,
wherein the non-transmissive member is a second reflection member that reflects the light, and
the first prism collects, onto the second reflection member, the light whose angle with respect to the normal line of the first and second transparent plate materials is equal to or greater than the first predetermined angle, and retro-reflects the collected light.

10. The multistage prism window according to claim 9, further comprising:
an image restoration prism installed so as to fill a space where the first prism and the second prism are not provided in a space between the first and second transparent plate materials,
wherein the image restoration prism includes a first image restoration prism provided corresponding to the first prism and a second image restoration prism provided corresponding to the second prism.

11. The multistage prism window according to claim 8,
wherein the non-transmissive member is a photoelectric conversion member that generates power by using light energy, and
the first prism collects, onto the photoelectric conversion member, the light whose angle with respect to the normal line of the first and second transparent plate materials is equal to or greater than the first predetermined angle, and generates power.

12. The multistage prism window according to claim 11, further comprising:
an image restoration prism installed so as to fill a space where the first prism and the second prism are not provided in a space between the first and second transparent plate materials,
wherein the image restoration prism includes a first image restoration prism provided corresponding to the first prism and a second image restoration prism provided corresponding to the second prism.

13. The multistage prism window according to claim 8,
wherein the non-transmissive member is a heat collecting member that heats a heat medium by using solar heat, and
the first prism collects, onto the heat collecting member, the light whose angle with respect to the normal line of the first and second transparent plate materials is equal to or greater than the first predetermined angle, and heats the heat medium.

14. The multistage prism window according to claim 13, further comprising:
an image restoration prism installed so as to fill a space where the first prism and the second prism are not provided in a space between the first and second transparent plate materials,
wherein the image restoration prism includes a first image restoration prism provided corresponding to the first prism and a second image restoration prism provided corresponding to the second prism.

* * * * *